Figure 1:
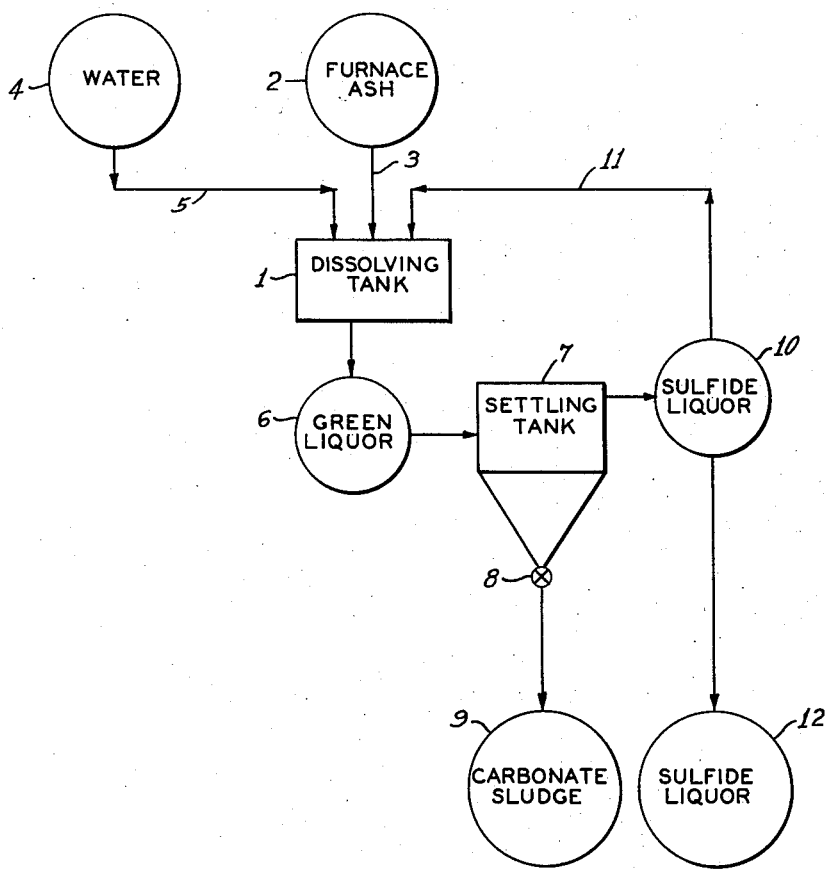

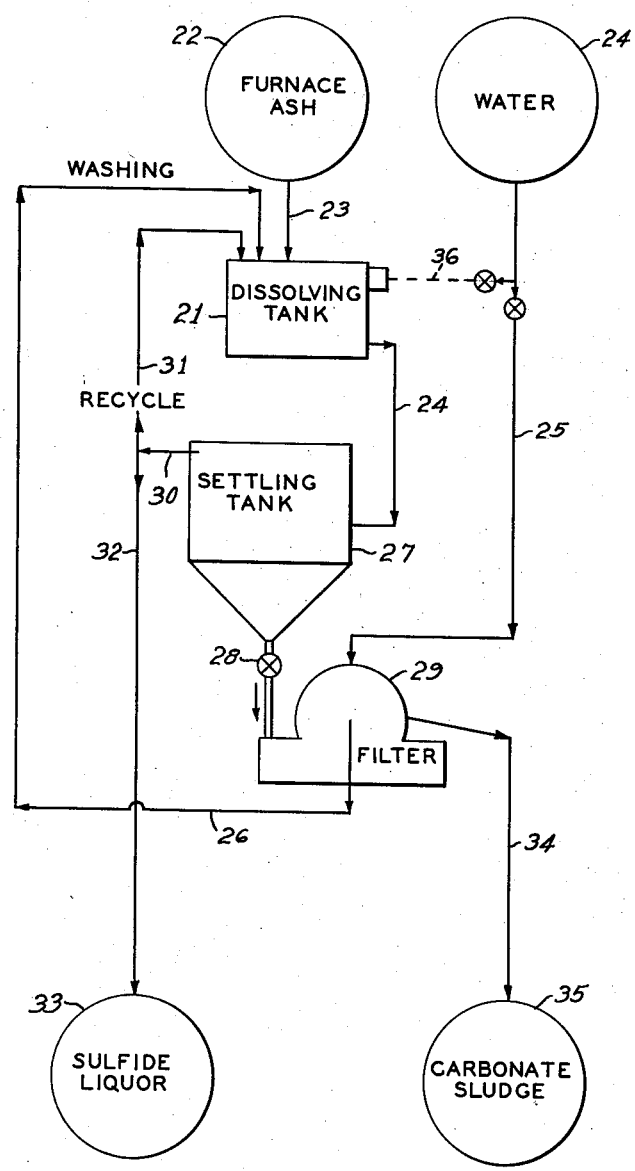

Patented June 16, 1953

2,642,399

UNITED STATES PATENT OFFICE 2,642,399

PROCESS FOR DISSOLVING ASH CONTAINING SODIUM SULFIDE AND SODIUM CARBONATE

Robert S. Aries and Arthur Pollak, New York, N. Y.

Application February 23, 1949, Serial No. 77,934

3 Claims. (Cl. 252—183)

1

This invention relates to improvements in the recovery of chemicals from the waste liquors of the sulfate and neutral sodium sulfite processes of pulping fibrous vegetable material. More particularly, the invention relates to an improved process for the production and separation of a concentrated sodium sulfide solution and of solid sodium carbonate from the black liquors of the sulfate and neutral sodium sulfite processes.

The sulfate pulping process utilizes a cooking liquor containing principally sodium hydroxide with appreciable quantities of sodium sulfide, and some sodium carbonate and sulfate. The waste or black liquor of the sulfate process, containing around 5 to 15% of solids, is a mixture containing sodium salts or compounds of organic acids and phenolic matter, etc. and also excess sodium hydroxide and sulfide, as well as sodium carbonate and sodium sulfate.

The neutral sulfite pulping process uses a cooking liquor containing sodium sulfite, and sodium carbonate or bicarbonate or both. The sodium sulfite is the active pulping agent, serving to convert insoluble vegetable matter such as lignin, etc. into soluble sulfonates. The chief function of the sodium carbonate or bicarbonate is to preserve the slight alkalinity of the cooking liquor by combining with acidic substances formed during the cooking. In the sulfite process for making semichemical pulp the proportions of sodium carbonate or bicarbonate to sodium sulfite range from 1 in 10 to about 3 in 10. The waste or black liquor of the neutral sulfite process is a complex solution containing usually from 5 to 15% of dissolved solids which are a mixture of the sodium salts of organic acids and phenolic substances together with sulfonates of organic matter and excess sodium sulfite, sodium carbonate, sodium bicarbonate and inert sodium sulfate.

When either of the black liquors from the sulfate process or from the neutral sulfite process, or mixtures of such liquors are evaporated to a combustible residue and the residue burned, a successive series of reactions takes place. The material first dries and then chars, with decomposition of sodium and sulfur compounds of the organic matter. A considerable amount, around half, of the organically combined sulfur escapes in the form of volatile sulfur compounds while the remainder of the sulfur forms sodium sulfate. The rest of the sodium compounds form sodium carbonate. As combustion progresses the volatilized sulfur compounds ultimately burn to sulfur dioxide. The sodium compounds pass through a reducing atmosphere or smelter whereby most of the

2 sodium sulfate, around 90%, is reduced to sodium sulfide, the remainder of the sodium sulfate remaining either unchanged or being reoxidized. This ash mixture, consisting principally of sodium sulfide and sodium carbonate with some sodium sulfate is readily fusible at the prevailing furnace temperatures and flows from the furnace or smelter as a molten stream of fused ash.

The common method of utilizing the salts contained in this molten ash is to add it to a dissolving tank to form a solution of all of the sodium salts in the ash. In operating black liquor furnaces and dissolving tanks it is the common practice to draw off either intermittently or continuously the solution accumulated in the dissolving tanks at about 20% solids, this solution being known as green liquor. By causticizing the resulting solution by treatment with lime the sodium carbonate is converted to caustic soda and a solution containing caustic soda and sodium sulfide is formed suitable for use in the sulfate process, or with adjustment of proportions of caustic and sulfide to give the appropriate proportions for this process.

The present invention provides an improved process of dissolving the molten ash which directly results in the production of a strong or concentrated sodium sulfide solution containing only a limited amount of sodium carbonate, and of sodium carbonate in a solid form, which products can be separately utilized or recombined to particular advantage for making cooking liquors.

The process of the present invention makes use of the hot, molten or fused green ash produced from the black liquors from a sulfate process or from the neutral sulfite process or from a mixture of such liquors by subjecting them to evaporation, combustion and reduction.

According to the present invention such molten or fused green ash is charged continuously into a large dissolving tank containing a large body of hot, strong or concentrated sodium sulfide solution which has a limited solubility for sodium carbonate; and there is continuously added to such body both strong or concentrated sodium sulfide solution and sufficient water to dissolve the sodium sulfide of the added green ash while leaving the sodium carbonate largely undissolved and to maintain the strong or concentrated solution; and there is continuously withdrawn from said body strong or concentrated sodium sulfide solution with sodium carbonate in suspension. The suspension thus withdrawn is advantageously subjected to settling to settle the sodium carbonate therefrom as a sludge and to give a concentrated sodium sulfide solution which is returned to the necessary extent to the dissolving tank.

By maintaining a strong or concentrated sodium sulfide solution in the dissolving tank and by continuously drawing off part of such solution, separating suspended sodium carbonate therefrom, and returning such sodium sulfide solution free from suspended sodium carbonate to the dissolving tank, the sodium carbonate of the added green ash is not only kept from dissolving except to a limited extent but is maintained in suspension in an amount of concentrated sodium sulfide solution far greater than that corresponding to the sodium sulfide content of the green ash added.

The continuous drawing off of the suspension of sodium carbonate in strong sulfide solution, with settling out of the sodium carbonate sludge and return of the strong sodium sulfide solution to the dissolving tank, results in maintaining a large body or pool of the strong sodium sulfide solution in the dissolving tank without accumulation of suspended sodium carbonate in the dissolving tank.

In contrast with the common method of dissolving green ash in water to form a solution containing, e. g., 20% solids in solution, and containing all of the sodium salts in solution, the present process maintains a large body or dominant pool of concentrated sodium sulfide solution in which sodium carbonate is relatively insoluble. Thus, for example, a neutral sulfite furnace ash or green ash having a composition of approximately 37 mole percent sodium sulfide, 59 mole percent sodium carbonate and 4 mole percent sodium sulfate, if dissolved in water to form a 20% solution (20% solids) would contain all of these salts in solution. But a concentrated solution of sodium sulfide at about 195° F. containing 1 pound of sodium sulfide dissolved in 3.5 pounds of water will dissolve only about 10% of the associated sodium carbonate and separate out about 90%; and it will dissolve only about 35% of the sodium sulfate and will separate out about 65% in the form of fine crystals easy to separate by settling. With a green ash from sulfate black liquor containing, for example, 17 mole percent sodium sulfide, 80 mole percent sodium carbonate and 3 mole percent sodium sulfate an even larger proportion of insoluble sodium carbonate will be separated out from such a concentrated sodium sulfide solution.

The recycled sodium sulfide solution, from which the sodium carbonate and sodium sulfate sludge is separated will return to the dissolving tank saturated with sodium carbonate and sodium sulfate and the fresh water added to dissolve the sodium sulfide of the green ash will only dissolve an amount of sodium carbonate and sodium sulfate which will saturate the solution. As a result, most of the sodium carbonate and sodium sulfate from the molten green ash will be separated in the dissolving tank in the form of fine crystals easy to separate by settling.

The relative proportion of concentrated sodium sulfide solution which is recycled after separation of suspended sodium carbonate and of fresh water added can be varied, but the amount of recycled sodium sulfide solution is advantageously greater and several times greater than the amount of fresh water added and fresh solution formed so that the proportion of sodium carbonate in suspension to sodium sulfide in solution in the dissolving tank and being continuously removed therefrom is a fraction only of that corresponding to the proportion of sodium carbonate to sodium sulfide in the green ash added.

The sodium sulfide solution formed and drawn off from the cycle is a concentrated sodium sulfide solution free from suspended sodium carbonate and sodium sulfate and containing only such small amounts of these salts as are soluble in such a concentrated sodium sulfide solution. The sodium carbonate is obtained directly as a solid product which can be separated from the settled sludge together with admixed sodium sulfate.

The recycling of the concentrated sodium sulfide solution to the large body of solution in the dissolving tank prevents the formation of a concentrated slurry of suspended sodium carbonate and sodium sulfate in this tank. In a solution where the water content is only around 3 to 4 pounds of water per pound of sodium sulfide, a concentrated slurry containing a large amount of undissolved sodium carbonate is difficult to agitate but by recycling the hot concentrated sodium sulfide solution to the dissolving tank, and continuously withdrawing a portion of the solution and suspended crystals, over-concentration of suspended matter, or the formation of a concentrated slurry, is avoided. The provision of a large circulating body of concentrated sodium sulfide solution into which the red hot ash is added together with fresh water avoids danger of violent explosions from the contact of the red hot ash with the solution and facilitates the quenching and dissolving of the sodium sulfide of the added ash and the handling of the resulting slurry or suspension of carbonate and sulfate crystals in the concentrated sulfide liquor, while minimizing danger of over-concentration.

A flow sheet illustrative of the process and of the apparatus for carrying it out is shown in Fig. 1 of the accompanying drawings. The dissolving tank shown conventionally at 1 is a large tank containing a large body or pool of concentrated sodium sulfide liquor, and is provided with stirring or agitating means. The molten or fused furnace ash or green ash indicated at 2 flows to the dissolving tank in a molten stream indicated at 3, while a regulated amount of water from a tank 4 flows through the line 5 to the dissolving tank. From the dissolving tank the green liquor containing suspended sodium carbonate and sulfate is drawn off and passed to a settling tank 7, fitted with a bottom rotary valve or other continuous sludge discharge device 8 from which the settled carbonate sludge together with any desired proportion of admixed or occluded liquor is drawn out of the cycle and collected as indicated at 9.

The clarified green liquor or concentrated sulfide liquor is drawn off from the settling tank 7 and returned as indicated at 10 through the line 11 to the dissolving tank. The major portion of the sodium sulfide liquor is thus returned and recycled, while a portion is withdrawn continuously as indicated at 12.

In starting up the process with fresh water in the dissolving tank the concentration of sodium sulfide will increase and with settling and recycling of the sulfide liquor the concentration of the sulfide liquor will approach a saturated solution and is advantageously maintained as a concentrated solution at a temperature around, e. g., 195° F. and containing about 3 to 4 pounds of water per pound of sodium sulfide.

The concentration of the sulfide solution formed is regulated by the amount of water added in proportion to the amount of molten green ash added and will be far less than that required for dissolving all of the sodium carbonate of the green ash added. However, in the presence of sodium sulfide of increasing concentration the sodium carbonate solubility is greatly reduced. And when an amount of water is used amounting to about 3 to 4 pounds of water per pound of sodium sulfide in the green ash added the amount of sodium carbonate dissolved in the hot liquor will be less than the amount of sodium sulfide. When somewhat larger amounts of water are used, around 5 pounds per pound of sodium sulfide, a larger amount of sodium carbonate is dissolved, in excess of the amount of sulfide. However, in the green ash from the sulfate process the amount of carbonate is so much greater than the amount of sodium sulfide that only a small part of the sodium carbonate will be dissolved even in a solution of that strength. Using green ash from the neutral sulfite process, containing a larger percentage of sodium sulfide, and an amount of carbonate usually less than twice the amount of sulfide, stronger solutions should be used and less water added to dissolve the sulfide while leaving the carbonate largely undissolved, e. g., 3 to 4 pounds of water per pound of sodium sulfide so that the amount of sodium carbonate dissolved will be materially less than the amount of sodium sulfide dissolved. The amount of water added should be more than about 2 pounds per pound of sodium sulfide in the green ash and should be sufficient to prevent over-saturation and prevent solidification or clogging of pipe lines.

Where the green ash dissolved has a relatively low sulfide content and a high proportion of sodium carbonate, the large amount of sodium carbonate sludge formed carries with it by entrainment a considerable amount of strong sodium sulfide solution. This results when the green ash is produced from sulfate black liquor or from the burning of neutral sulfide black liquor together with large proportions of sulfate black liquor.

In the treatment of molten green ash of such low sodium sulfide content the carbonate slude is advantageously filtered and washed with the fresh water used in the process and the sulfide solution displaced by the fresh water and removed from the sludge is returned together with the necessary amount of fresh water to the dissolving tank. This has the advantage of giving a carbonate sludge with greatly reduced content of sulfide and of returning the sulfide solution thus washed from the sludge to the dissolving tank.

In the treatment of such green ash a somewhat modified cycle of operations is advantageously used and illustrated in Fig. 2. This flow sheet is similar to that of Fig. 1 but includes a filter for filtering the carbonate sludge and for washing it with fresh water with return of the washings to the dissolving tank.

In the diagrammatic flow sheet of Fig. 2 the dissolving tank is shown conventionally at 21 and is a large tank containing a large pool or body of strong sodium sulfide liquor and is provided with agitating or stirring means. The molten or fused furnace ash or green ash indicated at 22 flows to the dissolving tank in a molten stream, indicated at 23. From the dissolving tank the green liquor containing suspended sodium carbonate and sulfate is drawn off through the line 24 to the settling tank 27, which is shown as fitted with a bottom rotary valve or other continuous sludge discharge device 28 from which the settled carbonate sludge together with admixed or occluded liquor in the desired proportion is transferred to a filter indicated conventionally at 29.

The clarified strong sulfide liquor is drawn off from the settling tank 27 through the line 30 and the major portion is returned through the line 31 to the dissolving tank, while a portion is withdrawn continuously through the line 32 to the sulfide liquor tank 33.

The carbonate sludge is washed on the filter 29 by a regulated amount of water supplied from the water tank 24 through the line 25 to the filter drum. The washings from the filter are returned through the line 26 to the dissolving tank. The flow of water is regulated so as to maintain the desired level of liquid in the dissolving tank 21. From the filter the carbonate sludge, with admixed water from the washing operation, is discharged through the line 34 to the sludge receptacle 35. A separate water pipe 36 is provided with regulating valve therein to permit adding water directly to the dissolving tank where this is desired.

The operation of the cycle illustrated by Fig. 2 is similar to that of Fig. 1 except for the filtering and washing of the carbonate sludge by the fresh water used in the dissolving tank. The hot molten green ash is added continuously to the dissolving tank together with a corresponding amount of water from the washing of the filter cake and which carries with it sodium sulfide in solution washed from the carbonate sludge. The strong sodium sulfide solution containing suspended sodium carbonate is continuously transferred to the settling tank where the carbonate sludge settles out. Most of the clarified sulfide liquor is likewise recirculated into the dissolving tank and the surplus withdrawn as the desired sulfide solution.

In this cycle of operations the sodium sulfide solution occluded in the sludge which settles in the settling tank and passes to the filter is displaced by washing with the quantity of water required for making up the depletion of water from the cycle, and the washings are pumped to the dissolving tank. The washed sludge or filter cake withdrawn from the cycle contains much less occluded sodium sulfide than where this filtering and washing operation is not used. The amount of wash water so used will not remove all of the adhering sodium sulfide from the carbonate sludge and this sludge can be further freed from the remaining sodium sulfide by further washing. The small amount of sodium sulfide remaining in the sludge may, however, be unobjectionable.

In the treatment of e. g., 10,230 pounds of sulfate liquor green ash containing 8,480 pounds of sodium carbonate, 1,325 pounds of sodium sulfide and 425 pounds of sodium sulfate, to produce a sulfide liquor containing about 3.5 pounds of water for 1 pound of sodium sulfide, the amount of clarified sulfide liquor which is recycled to the dissolving tank during the period of addition and dissolving of the above amount of green ash may be in excess of 200,000 pounds, while the amount of fresh water added for washing the filter cake to replace most of the sodium sulfidie solution therein and to supply fresh water to the dissolving tank may be only around 6,000 pounds. With this rate of recirculation of the settled sulfide liquor, the sodium sulfide solution withdrawn from the dissolving tank to the settling tank may contain only around 3% of sodium carbonate in suspension. The filtered and washed sludge contains around 8000 pounds of sodium carbonate, being made up, for example, of around 70% sodium carbonate, 24% water, 3% sodium sulfide and 3% sodium sulfate. The amount of strong sulfide solution drawn off from the cycle during the treatment of the above amount of green ash may be, for example, around 4,800 pounds containing about 3½ pounds of water per pound of sodium sulfide and containing around 10% sodium carbonate and 1 to 2% of sodium sulfate.

Green ash from neutral sulfite black liquor is richer in sulfide and so yields proportionally more sulfide liquor and less carbonate sludge. Mixtures of sulfate with neutral sulfite black liquors result in green ash compositions of intermediate value.

The strong sodium sulfide solution produced by the present process, with its relatively small content of sodium carbonate and sodium sulfate, can advantageously be used in making cooking liquors of high sodium sulfide content. These strong sodium sulfide solutions are also advantageously used for oxidation of the sodium sulfide to sodium sulfite in accordance with the process of our companion application Serial No. 77,935, filed February 23, 1949.

Where a sodium carbonate sludge product is desired substantially free from sodium sulfide it can be further washed with a limited amount of water to wash out the small amount of sodium sulfide which it contains and to give a sodium carbonate product well adapted for sulfiting with sulfur dioxide to form a solution of sodium sulfite for use in the neutral sodium sulfite cooking process.

By maintaining a large body of strong sodium sulfide solution in the dissolving tank and by adding green ash and fresh water in proportion to dissolve the fresh sodium sulfide to form a concentrated solution there is continuously produced a concentrated sodium sulfide solution from which the sodium carbonate formed is progressively separated by recirculation and settling of the solution so that excessive sludge formation in the dissolving tank is prevented and a sodium sulfide solution of high concentration directly produced.

It will be evident that the amount of sodium sulfide liquor withdrawn from the cycle will, when the process is in regular operation, correspond to the amount of fresh solution formed from the added green ash and the added water. The sodium carbonate will also be more or less continuously withdrawn as it is separated in the settling tank.

The two products thus produced and withdrawn from the cycle are the concentrated sodium sulfide solution and the solid sodium carbonate. And these two products are directly produced as the products of the dissolving operation from the fused or molten green ash and a corresponding amount of water brought together in a large body of strong sodium sulfide solution.

This direct production of a concentrated green liquor or sodium sulfide solution presents many advantages. This sulfide liquor is relatively free from sodium carbonate and sulfate and can be utilized to supply sodium sulfide for the sulfate process. The sodium carbonate which is separately recovered can be dissolved to form a sodium carbonate solution and separately causticized to form caustic soda before admixture with the sodium sulfide solution. Less solution is thus required for causticizing than when the usual solutions containing both sodium carbonate and sodium sulfide are causticized; and there is less danger of corrosion during the causticizing. The calcium carbonate sludge formed by the causticizing has less sodium sulfide in it, and can be more advantageously handled than the calcium carbonate sludge produced by causticizing admixed carbonate and sulfide liquors.

The improved process of the present invention is applicable to the treatment of the black liquor from the sulfate process and enables the sodium sulfide to be recovered in the form of a concentrated or saturated solution and the sodium carbonate as a separate solid product.

The present invention is also advantageously used with the black liquor from the neutral sulfite process where the green ash from the smelter has a larger proportion of sodium sulfide which can be separately recovered as a concentrated or saturated solution in a form well adapted for treatment by oxidation to form sodium sulfite for further use in the neutral sulfite process, together with admixed sodium carbonate in proper proportions.

The improved process can also advantageously be used with admixed sulfate and neutral sulfite waste liquors in varying proportions for it enables the fused or molten green ash produced from the admixed black liquors to be separated into a concentrated sodium sulfide solution relatively free from carbonate and a solid sodium carbonate product; which products can be separately treated or recombined in any desired proportions for making fresh cooking liquor for the sulfate or neutral sulfite processes.

The present process with its separate production and recovery of a concentrated sulfite liquor and a carbonate sludge offers many advantages over the usual dilute green liquor processes in which both the carbonate and the sulfide are present in solution and are treated together, e. g., by causticizing to form a sulfate cooking liquor. By separating the green liquor and obtaining it in a concentrated form which contains only small amounts of carbonate, and by separately recovering the sodium carbonate relatively free from sulfide, the carbonate can be used to form a separate solution and causticized and the sodium sulfide added to the caustic liquor in proper proportions for cooking use. This separation and recombination enables sulfate mills to prepare cooking liquors of varying content of caustic soda and sodium sulfide. This permits different digesters in the same mill to operate on different woods with cooking liquors of different composition, and the regulation of the proportion of caustic and sulfide and the varying of these proportions. In the continuous process of cooking the separation of the sodium sulfide solution and of the sodium carbonate and the separate causticizing of the sodium carbonate permits the caustic or the sulfide or mixtures thereof in different proportions to be added at successive stages of the continuous process; or the addition of more of one or the other of the chemicals during the process. Thus, the sulfide can be added at the outset or at an intermediate or later stage of the cooking cycle.

Where both a sulfate digester and a neutral sulfite digester are operated at the same plant the black liquors can advantageously be admixed and treated together. The more alkaline sulfate black liquor when admixed with the more nearly neutral sulfite liquor prevents generation of acidity from the sulfite liquor and reduces corrosion. And when the admixed liquors are evaporated and carbonized and reduced in a reducing furnace or smelter the resulting fused or molten green ash, whatever its proportions of sulfide and carbonate, can be readily handled by the present process and the sulfide and carbonate separately recovered in a form particularly advantageous for treatment or for recombination for use in the sulfate process; while the sodium sulfide, when oxidized to sodium sulfite and admixed with the proper amount of sodium carbonate, supplies the chemicals for the neutral sulfite cooking process.

Whatever the proportions of chemicals used in the cooking processes (sulfate or neutral sodium sulfite) and whatever the proportions of sodium sulfide and sodium carbonate, in the green ash from the reducing furnace, the present process enables sulfide and the carbonate to be separately recovered in a particularly advantageous form for use in making further amounts of cooking liquors.

We claim:

1. The improvement in the treatment of waste liquors from the sulfate and sodium sulfite cooking processes which comprises adding the fused ash from the evaporation, carbonizing and reduction of such waste liquors, and containing mainly sodium sulfide and carbonate, continuously to a large circulating body of hot, concentrated sodium sulfide solution containing from 2 to 5 pounds of water per pound of sodium sulfide ($Na_2S$) and having a limited solubility for sodium carbonate and containing in suspension a limited amount of sodium carbonate, continuously adding water to said body in proportion to form further amounts of hot concentrated sodium sulfide solution with the added sodium sulfide of the molten ash and to form added amounts of sodium carbonate in suspension in said body, continuously withdrawing from said body a portion of the hot concentrated sodium sulfide solution and suspended carbonate, separating suspended carbonate therefrom, continuously recycling a portion of the resulting hot clear concentrated sodium sulfide liquor to said large body, and continuously withdrawing a portion of the concentrated sodium sulfide liquor, the proportion of recycled hot concentrated sodium sulfide solution being several times greater than the amount of fresh solution formed.

2. The process according to claim 1 in which at least part of the water continuously added to dissolve the sodium sulfide is first used for washing the carbonate sludge to remove sodium sulfide therefrom with return of the sodium sulfide so removed to the dissolving operation.

3. The improvement in the treatment of waste liquors from the sulfate and sodium sulfite cooking processes which comprises adding the fused ash from the evaporation, carbonizing and reduction of such waste liquors, and containing mainly sodium sulfide and carbonate, continuously to a large circulating tank of hot concentrated sodium sulfide solution containing from about 3 to about 4 pounds of water per pound of sodium sulfide ($Na_2S$), continuously adding water to said tank in proportion to form further amounts of such concentrated sodium sulfide solution with the added sodium sulfide of the molten ash and to form added amounts of sodium carbonate in suspension, continuously withdrawing from said tank a portion of the hot concentrated sodium sulfide solution and suspended carbonate, separating the suspended carbonate therefrom, continuously recycling a portion of the resulting hot clear concentrated sodium sulfide liquor to said large tank, and continuously withdrawing a portion of the concentrated sodium sulfide liquor, the proportion of recycled hot concentrated sodium sulfide liquor being several times greater than the fresh solution formed.

ROBERT S. ARIES.
ARTHUR POLLAK.

References Cited in the file of this patent

UNITED STATES PATENTS

| Number | Name | Date |
|---|---|---|
| 1,659,193 | Drewsen | Feb. 14, 1928 |
| 1,906,886 | Richter | May 2, 1933 |

OTHER REFERENCES

Riegel, "Industrial Chemistry," 1942, pps. 84–87 are pertinent; 4th ed., Rheinhold Pub. Co., N. Y.